United States Patent
Ros et al.

(10) Patent No.: US 10,324,861 B2
(45) Date of Patent: Jun. 18, 2019

(54) SYSTEMS AND METHODS FOR COHERENCE IN CLUSTERED CACHE HIERARCHIES

(71) Applicants: Alberto Ros, Cartagena (ES); Stefanos Kaxiras, Uppsala (SE)

(72) Inventors: Alberto Ros, Cartagena (ES); Stefanos Kaxiras, Uppsala (SE)

(73) Assignee: ETA SCALE AB, Uppsala (SE)

( * ) Notice: Subject to any disclaimer, the term of this patent is extended or adjusted under 35 U.S.C. 154(b) by 460 days.

(21) Appl. No.: 15/015,274

(22) Filed: Feb. 4, 2016

(65) Prior Publication Data

US 2016/0232107 A1 Aug. 11, 2016

Related U.S. Application Data

(60) Provisional application No. 62/112,347, filed on Feb. 5, 2015.

(51) Int. Cl.
*G06F 12/1045* (2016.01)
*G06F 12/084* (2016.01)
(Continued)

(52) U.S. Cl.
CPC ........ *G06F 12/1045* (2013.01); *G06F 12/084* (2013.01); *G06F 12/0808* (2013.01);
(Continued)

(58) Field of Classification Search
None
See application file for complete search history.

(56) References Cited

U.S. PATENT DOCUMENTS 7,177,985 B1 * 2/2007 Diefendorff ........ G06F 12/0862
711/118
2005/0102473 A1 5/2005 Sakata et al.
(Continued)

FOREIGN PATENT DOCUMENTS

WO WO-2016045039 A1 * 3/2016 ............. G06F 12/08

OTHER PUBLICATIONS

International Preliminary Report on Patentability dated Dec. 16, 2014 in related International Application No. PCT/IB2013/054755.

*Primary Examiner* — Reginald G Bragdon
*Assistant Examiner* — James J. Thomas
(74) *Attorney, Agent, or Firm* — Patent Portfolio Builders PLLC

(57) ABSTRACT

According to embodiments described herein, the hierarchical complexity for coherence protocols associated with clustered cache architectures can be encapsulated in a simple function, i.e., that of determining when a data block is shared entirely within a cluster (i.e., a sub-tree of the hierarchy) and is private from the outside. This allows embodiments to eliminate complex recursive coherence operations that span the hierarchy and instead employ simple coherence mechanisms such as self-invalidation and write-through but which are restricted to operate where a data block is shared. Thus embodiments recognize that, in the context of clustered cache hierarchies, data can be shared entirely within one cluster but can be private (unshared) to this cluster when viewed from the perspective of other clusters. This characteristic of the data can be determined and then used to locally simplify coherence protocols.

7 Claims, 8 Drawing Sheets

(51) Int. Cl.
*G06F 12/0815* (2016.01)
*G06F 12/0897* (2016.01)
*G06F 12/0811* (2016.01)
*G06F 12/0891* (2016.01)
*G06F 12/0808* (2016.01)

(52) U.S. Cl.
CPC ...... *G06F 12/0811* (2013.01); *G06F 12/0815* (2013.01); *G06F 12/0891* (2013.01); *G06F 12/0897* (2013.01); *G06F 2212/1021* (2013.01); *G06F 2212/6042* (2013.01); *G06F 2212/684* (2013.01)

(56) References Cited

U.S. PATENT DOCUMENTS

| | | | |
|---|---|---|---|
| 2007/0168644 A1* | 7/2007 | Hummel | G06F 12/1081 711/207 |
| 2011/0231612 A1 | 9/2011 | Karlsson et al. | |
| 2015/0170396 A1* | 6/2015 | Kornmann | G06T 15/005 345/419 |
| 2015/0186283 A1* | 7/2015 | Mungikar | G06F 12/0862 711/133 |

\* cited by examiner

SYSTEMS AND METHODS FOR COHERENCE IN CLUSTERED CACHE HIERARCHIES

RELATED APPLICATION

This application is related to, and claims priority from, U.S. Provisional Patent Application 62/112,347, entitled "SYSTEMS AND METHODS FOR COHERENCE IN CLUSTERED CACHE HIERARCHIES", to Alberto Ros and Stefanos Kaxiras, the disclosure of which is hereby incorporated by reference.

TECHNICAL FIELD

Embodiments described herein relate in general to coherence in multiprocessor systems and, more particularly, coherence in systems having clustered cache hierarchies.

BACKGROUND

In many multiprocessor systems, memory devices are organized in hierarchies including main memory and one or more levels of cache memory. Data can reside in one or more of the cache levels and/or main memory. Cache coherence protocols are used in multiprocessor systems to address the potential situation where not all of the processors see the same data value for a given memory location.

Recently, architectures have been introduced where processors (or cores), and their respective cache memory devices, are grouped together into clusters. This can reduce network congestion by localizing traffic among several hierarchical levels, potentially enabling much higher scalability.

Memory systems are said to be coherent if they see memory accesses to a single data location in order. This means that if a write access is performed to data location X, and then a read access is performed to the same data location X, the memory hierarchy should return X regardless of which processor performs the read and write and how many copies of X are present in the memory hierarchy. Likewise, coherency also typically requires that writes be performed in a serialized manner such that each processor sees those write accesses in the same order.

There are various types of cache coherency protocols and mechanisms. For example, "explicit invalidation" refers to one mechanism used by cache coherence protocols wherein when a processor writes to a particular data location in a cache then all of the other caches which contain a copy of that data are flagged as invalid by sending explicit invalidation messages. An alternative mechanism is updating wherein when a processor writes to a particular data location in a cache, then all of the other caches which contain a copy of that data are updated with the new value. Both of these cache coherence mechanisms thus require a significant amount of signaling, which scales with the number of cores (or threads) which are operating in a given data processing system. Accordingly, these various cache protocols and mechanisms are known to have their own strengths and weaknesses, and research continues into improving cache coherency protocols with an eye toward maintaining (or improving) performance while reducing costs (e.g., energy consumption) associated with coherency traffic.

In their road map to scalable on-chip cache coherence, Martin et al. in their article entitled "Why on-chip cache coherence is here to stay," published in *Communications of the ACM*, vol. 55, pp. 78-89, July 2012, advocate that hierarchical and clustered design techniques provide a natural methodology for future scalable systems to overcome two main scalability problems of coherence: storage and traffic. Storage is drastically reduced by requiring the last-level cache to track only the clusters—not the individual cores inside each cluster. Global traffic is also reduced since portions of coherence transactions are handled inside the clusters, thus eliminating inter-cluster communication. As a direct result of intra-cluster locality, the last-level cache sends only a single invalidation message to a cluster and receives only a single acknowledgment message from that cluster each time a data block needs to be invalidated in all the cores inside that cluster.

Despite the arguments in support of clustered cache hierarchies, there are also obstacles to overcome as a prerequisite for their wide adoption by the industry. The prevalent obstacle is the complexity and cost due to the coherence that must be implemented. For example, a hierarchical, invalidation-based, MOESI directory protocol has a very high number of states, mainly in the intermediate-levels of the hierarchy. This high number of states is the result of the interplay between invalidation-based, directory coherence and clustering.

For example, invalidation-based, directory coherence must fundamentally perform two functions:
1. Invalidation upon write: upon a write miss, invalidate all other sharers.
2. Indirection and downgrade: upon a read miss, find the latest written value and downgrade the writer.

These two functions enforce the Single Writer Multiple Reader invariant and ensure that written values are propagated correctly. The complexity of a flat (non-hierarchical) directory providing this functionality is well understood and, although there is ample implementation experience, there are also significant advantages in simplifying even this case. In the case of a hierarchical clustered cache architecture, directory-based coherence becomes significantly more complex: it must also be performed hierarchically. A clustered cache hierarchy is handicapped if coherence is not implemented using a hierarchical directory and a hierarchical (tree) protocol. A single flat directory at the root of the hierarchy (e.g., the lower level cache or LLC) simply negates the scalability of the whole approach and proves problematic in handling caching in intermediate levels between the root (LLC) and the leaves (L1s).

Thus, both the invalidation and the indirection/downgrade functions have to be performed hierarchically. This means that intermediate nodes must have the ability to simultaneously behave both as root caches/directories (i.e., send invalidations, collect acknowledgements, indirect requests, as does the LLC) and as leaf caches (i.e., respond to invalidations and/or downgrades, as do the L1s). Moreover, one personality (leaf or root) can invoke the other recursively. For example, invalidations treat nodes in intermediate levels both as leaf nodes to be invalidated but also cause them to behave as root nodes initiating new invalidations in their sub-cluster (similarly for downgrade requests). It is this dual behavior and the resulting cross-product of the states of the two personalities (root and leaf) in intermediate levels that increases the implementation complexity to prohibitive levels. Verification becomes inordinately costly and time to market may be dangerously compromised.

Accordingly, it would be desirable to provide systems and methods that avoid the afore-described problems and drawbacks associated with the handling of coherence in systems employing clusters of cores and caches.

SUMMARY

According to an embodiment, a method for cache coherence in a computer system having a clustered cache hierarchy, includes the steps of storing a common shared level (CSL) value for a data block stored in the clustered cache hierarchy; and when the data block is written, using a coherence mechanism to update the status of the data block for one or more caches within a cache cluster indicated by the CSL value and treating the data block as private for one or more caches outside of the cache cluster indicated by the CSL value.

According to another embodiment, a computer system includes multiple processor cores, at least one local cache memory associated with, and operatively coupled to, a respective one of the multiple processor cores for storing one or more cache lines of data accessible only by the associated core, at least one intermediary cache memory which is coupled to a subset of the multiple processor cores and which stores one or cache lines of data; at least one shared memory the shared memory being operatively coupled to all of the cores and which stores multiple data blocks; and wherein each cache line has a bit that signifies whether this cache line is private or shared.

According to another embodiment, a computer system includes multiple processor cores, a clustered cache memory hierarchy including: at least one local cache memory associated with and operatively coupled to each core for storing one or more cache lines accessible only by the associated core; and a shared memory, the shared memory being operatively coupled to other shared memories or the local cache memories and accessible by a subset of cores that are transitively coupled to said shared memory via any number of local memories and intermediate shared memories, the shared memory being capable of storing a plurality of cache lines, wherein each cache line has a private/shared bit that signifies whether this cache line is private or shared in said shared memory.

According to still another embodiment, a method for resolving a core's read miss includes the steps of starting from a shared memory where the data associated with the core's read miss is found to a local L1 cache associated with the core performing the steps of: allocating the data associated with the core's read-miss in intermediate memories between the shared memory and the local L1 cache; and setting a private/shared (PS) bit's value in each intermediate memory so that the PS bit changes from P to S at a common shared level.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore cache coherence protocols. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to embodiments described herein, the hierarchical complexity for coherence protocols associated with clustered cache architectures can be encapsulated in a simple function, i.e., that of determining when a data block is shared entirely within a cluster (i.e., a sub-tree of the hierarchy) and is private from the outside. This allows embodiments to eliminate complex recursive coherence operations that span the hierarchy and instead employ simple coherence mechanisms such as self-invalidation and write-through but which are restricted to operate where a data block is shared. Thus embodiments recognize that, in the context of clustered cache hierarchies, data can be shared entirely within one cluster but can be private (unshared) to this cluster when viewed from the perspective of other clusters. This characteristic of the data can be determined and then used to locally simplify coherence protocols.

Figure 1:
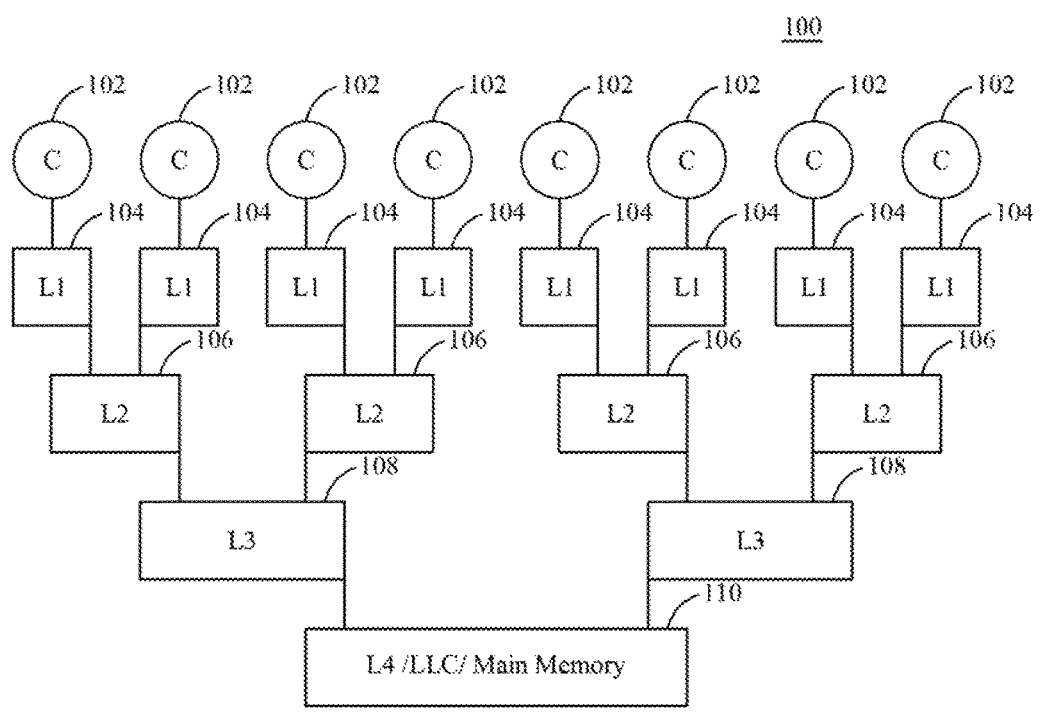
FIG. 1 illustrates a clustered hierarchical cache memory system and multiple processor cores in which embodiments can be implemented.

To provide some context for understanding an environment in which the embodiments can operate, consider an example of a computer system 100 as shown in FIG. 1. Therein the system 100 includes multiple processor cores 102, each of which is associated with and coupled to, a level one (L1) cache memory 104. The L1 caches 104 are, in turn, associated with and coupled to, a level two (L2) cache 106 in pairs. Similarly, the L2 caches are associated with and coupled to level 3 caches 108 in pairs, which are themselves coupled to a higher level memory 110 which can be referred to as a level 4 (L4) cache, a last level cache (LLC) or main memory. All of the caches 104, 106, 108 and 110 are configured to and capable of storing one or more cache lines of data (or more generally "data blocks"), and the cores 102 can access data blocks stored in caches 102, 104, 106, 108 and 110 to which they are connected. All of the elements shown in FIG. 1 are interconnected in the manner shown by some form of network interconnect as will be appreciated by those skilled in the art. Those skilled in the art will further appreciate that the computer architecture illustrated in FIG. 1 is purely exemplary and that the embodiments can be implemented in different architectures than the one illustrated therein. For example, and as described further below, the cache hierarchy need not be symmetrical or fully populated.

Before continuing the more detailed discussion of the embodiments, some nomenclature and basic principles used herein are first presented. In a hierarchical cache architecture, such as that illustrated in FIG. 1, the level of a cache corresponds to the naming of caches, e.g., the level of an L1 cache is 1 and is the lowest level, and the level of an L4 cache is 4. If, for example, L4 is the LLC then it is the highest level and the root of the hierarchy. In any sub-tree, also called a cluster, the cache at the highest level of this sub-tree is its root cache. Leaf caches are always the L1s. Any cache between the leaves and a root is an intermediate cache. In these embodiments, symmetrical, constant-degree, fully populated hierarchies are used as examples, but those skilled in the art will appreciate how to extend these embodiments to include other embodiments such as partially-populated, or non-constant degree, or asymmetrical hierarchies.

As recognized by these embodiments, data blocks can be shared entirely within a cluster and not outside. For example, if the block is in just two L1s 104 which share the same L2 106 in a small cluster, then the block is referred to herein as shared in the L1s. But from the outside, the block is referred to herein as private to the cluster. In the leaf and intermediate caches, embodiments only need to know that the block is shared (indicating that it self-invalidates and follows a write-through policy). Outside the cluster, embodiments need to know the level where the block changes from private to shared; in other words, the level of the root cache of the cluster. This is referred to herein as the common shared level (CSL) for this block. In the example above, the shared block between the two L1s 104 is private in L3 108 and L4 110 seen from L2 106 (the block's CSL is 2). The actual L2 106 that has this block privately needs to be known for various operations. However, its identity can be derived by knowing only the first core 102 that accessed the block and the block's CSL.

Figure 2:
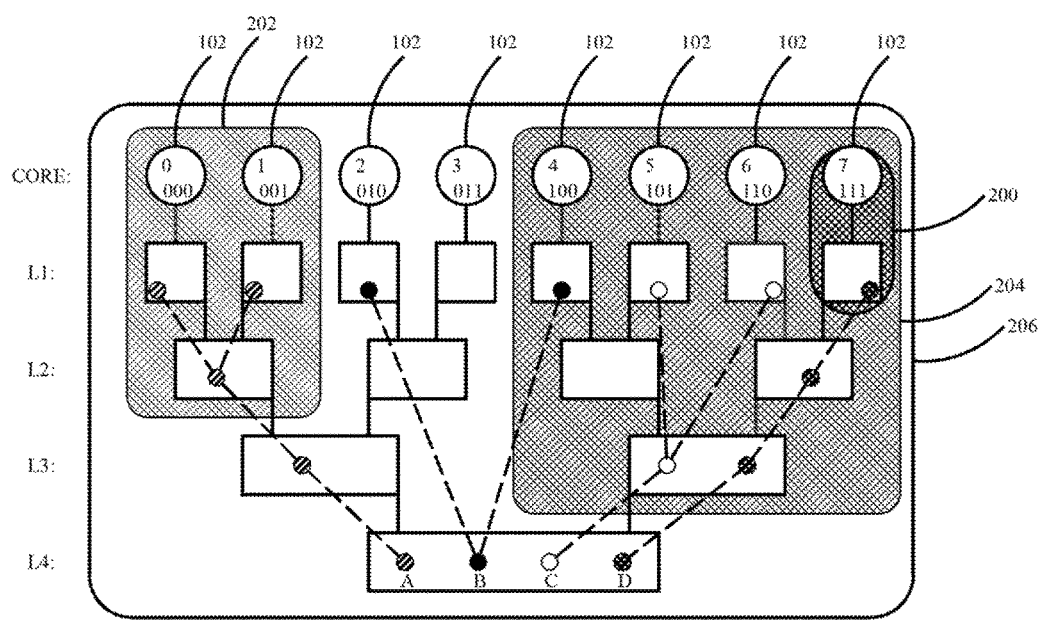
FIG. 2 depicts clusters of caches in which various data blocks may be considered to be shared and outside of which the data blocks may be considered to be private according to an embodiment.

FIG. 2 illustrates an example of what private/shared data block classification for clusters means using the hierarchical cache example of FIG. 1. The system 100 is subdivided into many clusters at the various levels described above (L1-L4) as shown. In this embodiment, it is assumed that it has been determined with which clusters certain data blocks are associated and whether they are private or shared relative to those clusters. Examples of techniques for how to make this determination are provided below. More specifically, four data blocks A-D are depicted, each of which is associated with a cluster at a different level in FIG. 2.

Specifically, data block D is determined to be private to core 7 102, i.e. it is private to a first level (L1) cluster 200 including core 7 102 and its associated level 1 cache. Data block A is determined to be shared between cores 0 102 and 1 102. It is, however, also determined to be private to the L2 cluster 202 that contains these two cores. Similarly, block C is shared by cores 5 102 and 6 102 inside the L3 cluster 204 which contains both these cores and is thus private to cluster 204. Finally, block B, shared by cores 3 102 and 4 102, is shared at the L4 (system) level 206. According to embodiments described below, this classification is performed dynamically as data blocks are accessed by cores 120. For efficiency, and according to some embodiments, the page table is used to detect the level of sharing at page granularity. A page is classified as shared at the highest-level cluster that encompasses the sharing of all its blocks. Once the classification is performed for a page, self-invalidation and write-through of all its blocks become localized to the cluster wherein it is shared.

For example, in FIG. 2 block A is self-invalidated in the L1s within cluster 202, but not outside the L2 cluster 202 (i.e., its private chain of copies in the L2, L3, and L4 is left undisturbed). Block A is also written-through to the L2 in cluster 202, but no further—its private copies outside the L2-cluster 202 follow a write-back policy. Similarly, block B is self-invalidated in all the levels between L1 and L4 (exclusive), and it is written through to the L4.

If a new core 102 requests a shared block from outside the cluster where that block is shared, then the block's sharing level changes. According to some embodiments, the page table is used to detect changes in the sharing level at a page granularity. Embodiments do this to minimize the number of transitions since: i) the sharing level of a whole page—not each individual block—changes at once; and ii) page-level transitions can happen only when a core first accesses a block and thus has to take a TLB miss. In contrast, and according to other embodiments, classification at block granularity would entail transitions for each individual block on cache misses, which are far more numerous than TLB misses. While at page level there is a coarser grain, less accurate classification (leading to more blocks classified as shared at higher levels—i.e., more globally), the transitions are far fewer and therefore their cost is not as critical.

FIG. 2 and its corresponding text illustrate the relationship between private and shared data blocks in a hierarchical cache clustering architecture which results once the common sharing level has been determined. Next an embodiment which illustrates how to detect the common sharing level, and changes thereto, will be discussed.

Since some embodiments perform hierarchical classification at a page granularity, CSL changes are detected on TLB misses. Associated with each page table entry is the core that first accessed this page and the current common sharing level. The first core that accesses a page is the only owner of the page (globally private) and CSL is set to 1. If another core attempts to access the same page then a new CSL is derived by comparing the ID of requesting core with the ID of the original owner. Assume that core IDs are n-bit numbers. For a hierarchy of a degree of d embodiments divide the core IDs into segments of log 2(d) bits. Pairwise segments of the two IDs are compared starting from most significant end. The position of the first pair of segments, i.e., bits, that differ, identifies the CSL, i.e., CSL_level=segment_position+1.

Figure 3A:
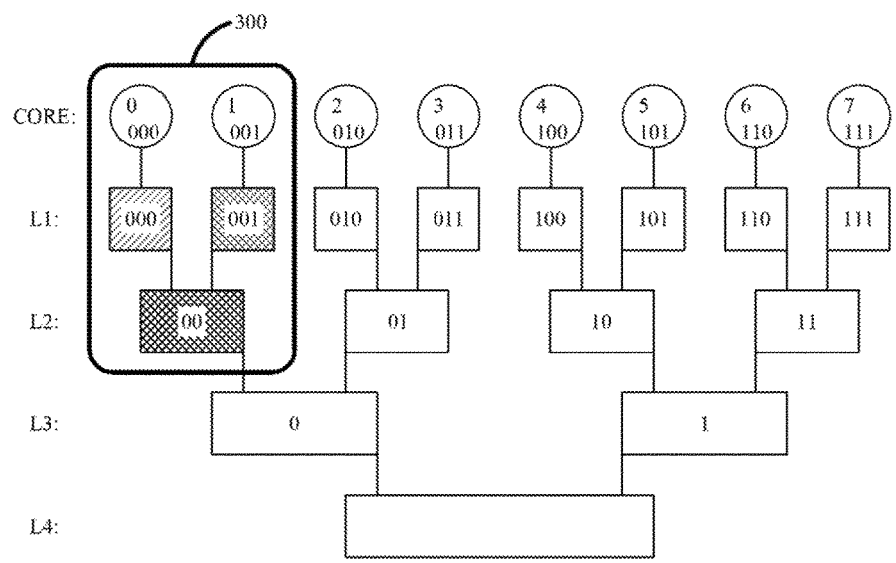
FIGS. 3(a)-3(c) illustrate a technique for determining a common shared level for various data blocks according to an embodiment.
Figure 3B:
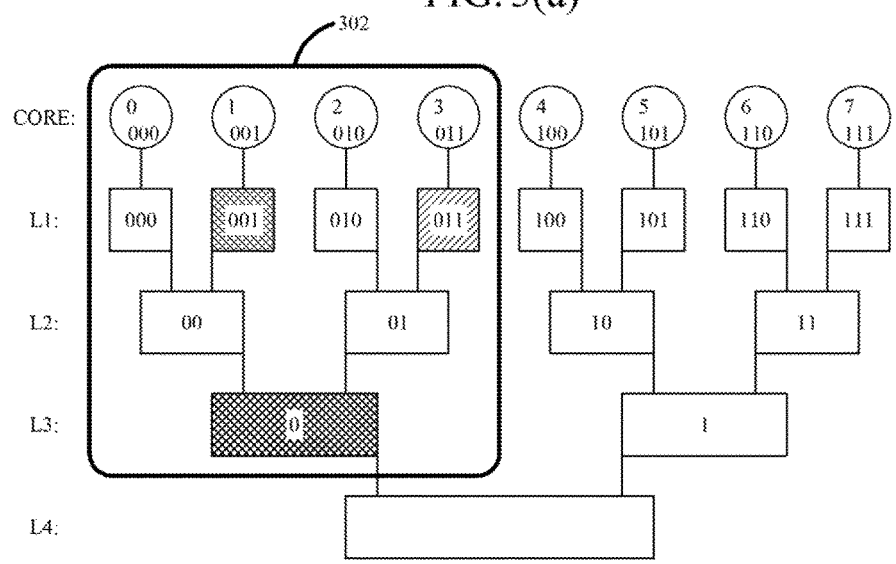
Figure 3C:
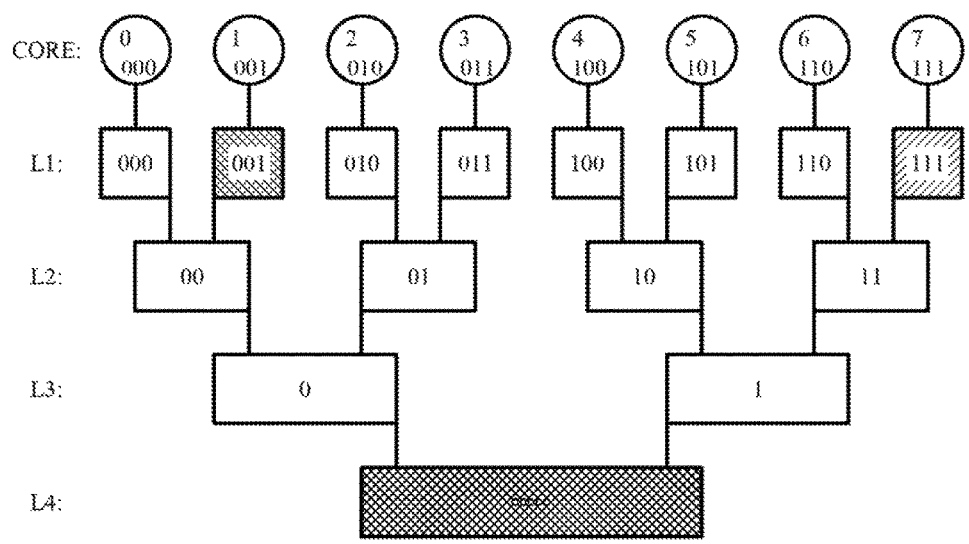

As an example of a method for determining a common sharing level of a data block according to this embodiment, consider FIGS. 3(a)-3(c). In FIG. 3(a), consider that the first core 102 that accesses the page is core 1, i.e., 001. If the second core which accesses that same page is core 0, i.e., 000, then they differ in the least significant bit, first bit, ergo the CSL for this page changes to 2, i.e., 1+1. The L2 cache 106 that is shared at this level is always identified by the most significant segments that are the same: 00, indicating that this page is private to cluster 300.

If, on the other hand, the second core which accesses this same page is instead core 011 as shown in FIG. 3(b), this core differs from core 001 in the second segment; i.e., the second (least significant) bit, therefore the CSL changes to 3, i.e., 2+1. The shared L3 cache is still identified by the most significant segments or bits that remain the same: 0, and in this case the page of interest is private to cluster 302.

Similarly, if the second core to access this page is 111 as shown in FIG. 3(c), it differs from core 001 in the most significant third position, thus the CSL changes to 4. The shared cache is L4 which is uniquely identified. If a requesting core differs from the first core in a position that gives a CSL that is less than the current CSL, then the requesting core is already in a sub-tree where the data are identified as shared. This method for determining a CSL of a data block (e.g., a page) works because, for example, the first core that accesses a page defines how the sharing sub-tree will grow. An advantage of this algorithm is that a core ID is only stored once per page (for the first core) and never needs updating. The CSL for the page, however, may be changed as new cores 102 are requesting the page.

According to an embodiment re-classification from shared to private is only performed upon page evictions from main memory. Since classification is done in software it can be changed to an adaptive approach, using for example decay techniques. There is, however, another case in which it may be desirable to perform re-classification and this is for private data on thread migration. In the event of a migration private pages are self-invalidated and shot down from the TLB of the last owner core and the page owner in the page table is changed to the destination core as the TLB entries are reloaded by it. Thread migration does not affect already shared pages unless threads are migrated to new clusters. This might increase the CSL of the pages and—in the absence of re-classification—can be taken under consideration in the migration policy Once a change in the CSL is detected according to an embodiment, the next steps involve encoding/saving the new CSL and then using the new CSL. The current CSL of a page and its first owner are always associated with the page table entry (PTE). These two values can be saves within the PTE if there are available unused bits, or alternatively, in a separate memory structure. According to an embodiment this information will be cached in the system (last-level) TLB, if one is available. The overhead is low since only log 2(N) bits are needed for the first owner and 1 log 21 log 2 N/log 2 dll for the CSL, in a system with N cores and a hierarchy of degree d.

However, per-page CSL information should be readily available to restrict self-invalidation and write-throughs to the appropriate cluster, independently for each page. According to an embodiment, there are three operations in this approach.

Self-Invalidation:
Self-invalidates data of a page in all the leaf and intermediate caches up to (but excluding) the CSL. From the CSL onwards (i.e., to higher levels) the page is considered private and does not self-invalidate.

Self-Downgrade:
Write-throughs are propagated for this page from the L1s all the way to the CSL but not further.

Recovery:
Finally, when the CSL changes all of the modified data that reside in the old CSL cache is propagated to the new CSL cache and globally update the CSL information. Essentially this is the only example of a forced downgrade, similarly to other protocols, but this embodiment restricts it to classification where it is uncommon. To distinguish it from much more common self-downgrade, this operation is referred to herein as recovery.

According to an embodiment, only the CSL is stored—no owner field—in the core TLB entries. Cache lines do not need to store CSL info, just a private/shared (P/S) bit. This has the advantage of the CSL being available a-priori, at the time when a request is generated, allowing for the possibility of skipping intermediate cache levels and going directly to the CSL cache. This ability is useful when intermediate caches do not store shared data. Knowing the CSL would allow embodiments to write-through directly to the CSL cache and optimize atomic operations which only concern the CSL cache and not any intermediate cache.

Recovery of a page (increasing its sharing level) concerns all TLBs that contain an entry for this page. Embodiments ensure that the correct (new) CSL information is communicated to all the cores that can have a copy of the PTE in their TLB because it is useful to change the level of the future requests for this page. Potentially this includes all the cores of the cluster whose root cache is the old CSL cache.

To recover a whole sub-cluster, embodiments first ensure that all the TLBs in cluster are locked. This criterion can be relaxed when a TLB does not hold the corresponding PTE, since the page table entry itself is locked by the core causing the recovery. This is achieved with core-to-core interrupts (a feature which is available in many architectures). The core causing the change in the CSL interrupts all cores whose root cache is the old CSL. Embodiments wait until there are no MSHR entries for the page—i.e., no pending requests for the page. Then all cores block any new requests for that page (lock bit in the TLB) and send a forward recovery to the shared cache.

Subsequently, embodiments self-downgrade all the dirty blocks of the page being recovered, from the old CSL cache to the new one, and change the policy of all blocks (in the old CSL cache) from write-back to write-through by setting their P/S bit to S. Blocks already shared (i.e., in write-through mode) for that page do not need to be recovered. If the recovery is only one level up, the only cache to recover is the old shared level cache. However, if the recovery is n levels up, we must recover all the caches of the next n-1 levels towards the new CSL. This is because all the dirty data present in any intermediate cache must be reflected in the new CSL cache.

When the recovery of the old CSL cache is done, acknowledgements are sent to the TLBs that are locked. The acknowledgment updates the CSL of the TLB entry and resets the lock bit in the TLB. One of the cores (e.g., the core with smallest ID in the cluster) unlocks the page table.

Recovery of a page is an expensive operation. However, it is offset by the fact that it is quite rare. It only happens a few times per page (no more than #HierarchyLevels—1 per page). For this reason, it is the operation of choice to burden with the complexity of a hierarchy, allowing for much more common operations (reads, writes, self-invalidations, and self-downgrades) to be implemented more efficiently. Furthermore, some embodiments support this operation in software. Software can be changed, debugged, and verified using pro-gram verification techniques. Thus, CSL management and coherence operations are separated so that the protocol components can be verified with a divide-and-conquer approach.

A different type of classification that is especially useful with self-invalidation is read-only (RO) classification. Shared read-only data can be excluded from self-invalidation. Read-only classification can be easily implemented, relying on the RO bits of the PTEs. When a page transitions from RO to read-write (RW), embodiments can also perform a recovery to notify all the cores that share this page about the change, so they can start self-invalidating the corresponding cache lines.

The classification change from RO to RW inside the cores can be deferred until the next synchronization in each core. The only requirement is that all the cores in the cluster where the page is shared be notified about the RO-to-RW change before the core that causes the change passes a synchronization point. This is done by sending notifications and collecting acknowledgements, without the need to block any cores. Note that an RO-to-RW transition imposes no cost, except in the uncommon case where a core that caused such transition may have to wait for the acknowledgements to pass its next synchronization.

Using one or more of the hierarchical data classification techniques described above, embodiments can then use those classifications to implement a coherence protocol in a computer system which, for example, relies on self-invalidation and self-downgrade of shared data blocks. One primary coherence policy decision that affects the implementation of these coherence operations concerns how the embodiments use the intermediate caches between the root cache and CSL and between the CSL and the leaf caches per data block each of these are now discussed in more detail.

Intermediate Levels Between the Root Cache (LLC) and a CSL Cache.

A block is private between the LLC and its CSL (P/S bit set to P). For performance reasons embodiments allow copies of the block to exist between the LLC and the block's CSL, but do not enforce inclusion. When satisfying a request at a level higher than the CSL (because the CSL and possibly other levels have evicted) embodiments rebuild the private chain from the LLC to the CSL by copying the block in all the levels where it is missing. The P/S bits of these copies are set to P (and the correct CSL is copied in them, if the system encodes it in the caches).

Intermediate Levels Between the CSL Cache and the Leaf Caches (L1 s).

Figure 4:
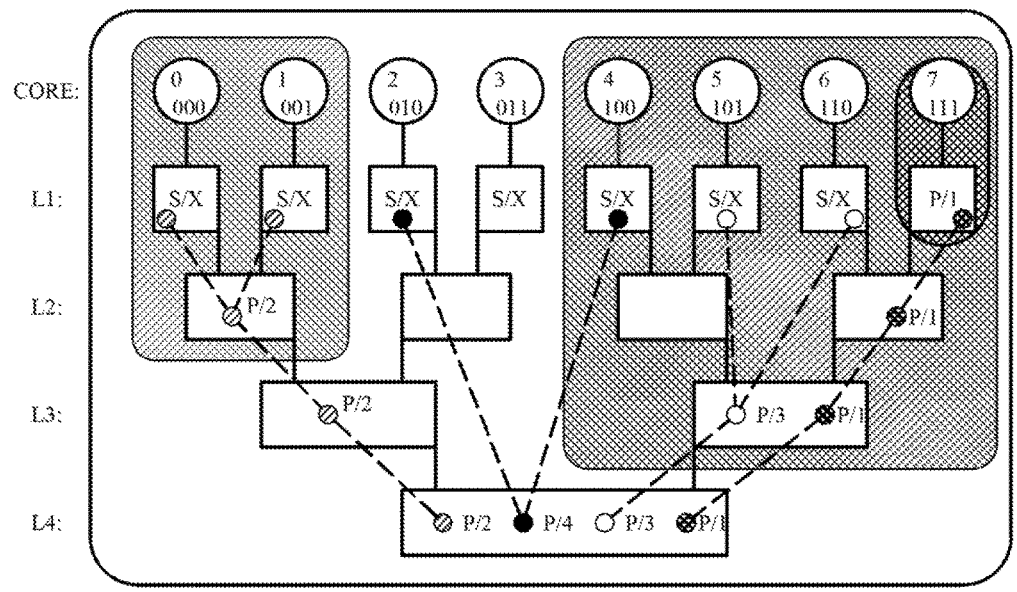
FIG. 4 shows two level sharing according to an embodiment.

A block is shared between its CSL and the L1 s (P/S bit set to S). According to various embodiments two policies could be employed. First consider a strictly two-level policy. A shared block exists only in the L1 s and in the CSL, but not in intermediate caches. The advantage of this approach is the simplicity in self invalidation (which is strictly restricted in the L1 s) and potentially in self-downgrade (if the CSL is known and intermediate levels can be skipped). The recovery operation must also self-invalidate the old CSL, in addition to self-downgrade. The disadvantage is lower performance from more costly misses. This policy is shown in FIG. 4 where all sharing is strictly two-level.

Figure 5:
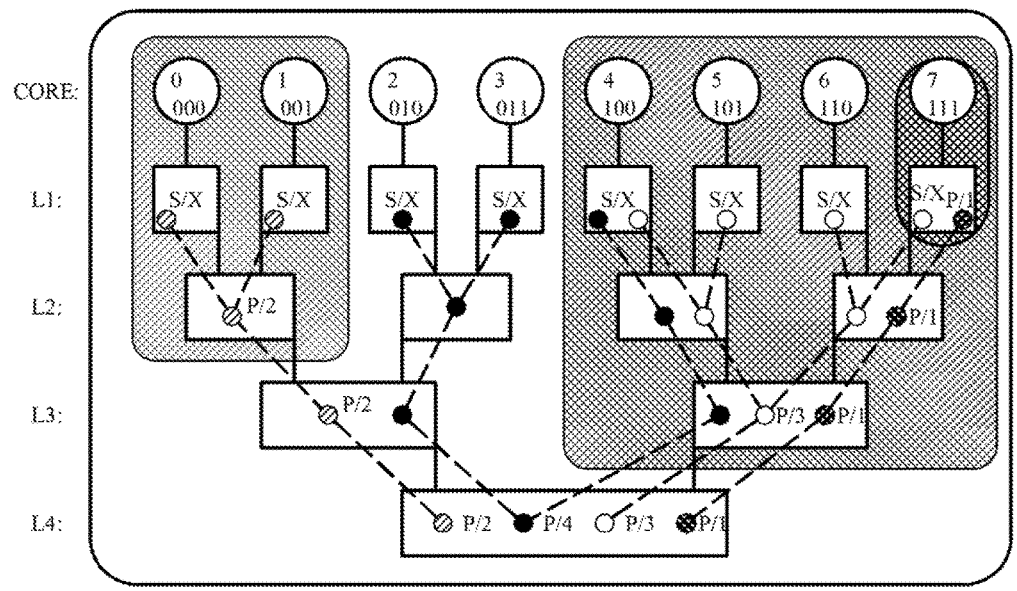
FIG. 5 shows multilevel sharing according to an embodiment.

A second policy which could be employed for intermediate levels between the CSL cache and the leaf caches is a multilevel policy. A shared block can exist in any intermediate level between the L1s and the CSL. The advantage of this policy is higher performance, but self-invalidation and self-downgrade must now cascade all the levels between the L1 and the CSL. This policy is shown in FIG. 5 where sharing is multilevel.

Next, embodiments describe coherence protocol design using such policies starting with the more frequent coherence events (e.g., read and write misses), and then moving to less frequent coherence events (e.g., atomic operations, self-invalidations, and self-downgrades).

DRF Memory Accesses (Loads and Stores):

A DRF miss searches for the block in the cache hierarchy, starting from the first level and stopping at the level where the data are found. The response copies the data in intermediate caches. For every copy we set its P/S bit that indicates whether it is invalidated on self-invalidation. To set the P/S bit embodiments need to know the CSL, which comes from the TLB. For levels below the CSL (i.e., between the L1 and the CSL) we simply set the P/S bit to S. If the strictly two-level policy described above is followed, then an embodiment will skip the intermediate levels between the CSL and the L1.

A DRF store writes in the L1 and is always a hit. No invalidations and no extra latency are incurred. Out of the critical path of the store, the data block is requested (as in a load request) and when it arrives it is merged with the modified words. When the L1 cache line is self-downgraded, the write through of the dirty words (i.e., the diff of the cache line) cascades and updates all the shared copies of the intermediate levels until it finds a private copy (at the CSL or greater level). At that point the write-through stops and merges the diff in the data block. Levels that have evicted the copy are simply skipped.

An invariant of this approach is that it does not allow dirty blocks in intermediate levels. Instead embodiments only store dirty blocks in the L1 cache and in the CSL or higher levels. This means that embodiments do not need dirty bits per word at any cache level (only in the L1 MSHRs to create diffs). Dirty data in the CSL or higher levels, use a write-back policy (since they are private) and only a single dirty bit per cache line is needed.

Evictions:

Evictions of clean lines are silent. An eviction of a dirty line can cause a write-through or a write-back de-pending on where it is in the hierarchy. Since we only allow clean copies in the intermediate levels between the L1 and the CSL an eviction can cause a write-through only in the L1 (where there are create diffs). Write-throughs cascade to the CSL or higher level, updating all the intermediate caches that have the block. With the strictly two-level policy, intermediate caches are not updated. Write-backs simply write the whole block into the next cache level.

Non-DRF Memory Accesses (Atomics and Other):

Load-through, store-through, atomic, read-modify-write requests always operate at their CSL and no other level. Since the CSL is known from the TLB, all intermediate levels can be skipped as an optimization. The hierarchy is searched for a private line. If this line is not at the CSL but higher (towards the LLC), it is copied in all the levels, from where it is found all the way to the CSL. At this point the atomic request has reached the CSL and blocks the requested line. When the atomic is resolved, it either writes or sends an unblock message to the CSL, so other atomics can proceed. This approach does support arbitrary data races as long as they are intended and identified. Using the proper fences (see below) racing accesses can be implemented in any self-invalidation/self-downgrade protocols. In these cases, competing accesses meet directly in the CSL.

Self-Invalidation and Self-Downgrade Fences:

In SC for DRF, synchronization is exposed to the hardware. Assume that fences in the program perform this job. A release operation corresponds to a self-downgrade fence (SD fence) that completes all outstanding write-throughs. An acquire operation corresponds to a self-invalidation fence (SI fence) that causes the self invalidation of shared data. In a hierarchical clustered architecture these fences operate as follows.

SI fence: In the strictly two-level policy the SI fence operates exclusively in the L1 s. However, in the multilevel policy the self-invalidation cascades to all cache levels from the L1 to the LLC. At every level it performs a 1-cycle flush by bulk-resetting the valid bits of the shared (non-read-only) lines. Self-invalidation flushes all the blocks whose CSL is higher than the level they reside. This is guaranteed by the way their P/S bits were set.

SD fence: SD concerns the first level. Cache line diffs are written-through as explained above (DRF memory accesses). The SD fence awaits for the completion of the write-throughs of all the lines that are temporally dirty and have an allocated MSHR.

Coherence protocols such as those described herein are intimately connected to the synchronization model since they rely on data-race-free (DRF) semantics and synchronization exposed to the hardware to deliver SC for DRF. But in a hierarchical clustered cache architecture, it becomes difficult to define what is meant by DRF. The issue at hand is scoped synchronization which operates locally within a cluster versus globally-scoped synchronization which operates across clusters. According to various embodiments two memory models are proposed: HRF-direct and HRF-indirect. In an HRF-direct model transitivity is only guaranteed for same-scoped synchronization. In an HRF-indirect: transitivity is guaranteed for different-scoped synchronization.

Taking the analogy from GPUs to a general clustered architecture the scope of any synchronization depends on the CSL of the synchronization variable. Assume now that a system employs scoped synchronization (e.g., it is offered in the programming model). In order for cores in a cluster to synchronize, the synchronization variable (lock, barrier flag, etc) must be shared at the level of the cluster's root cache. Accesses inside the cluster separated by this synchronization are DRF. However, if any core in the cluster synchronizes with a core in a different cluster, a new CSL (which encompasses both clusters) is established for the synchronization variable. If the new cluster attempts to access data that were private in the first cluster then such data become (through the process of recovery) shared in the new CSL, before the access is allowed to proceed. Thus, the latest values of the data are exposed (on demand) to the new cluster. This guarantees the transitive behavior dictated in the HRF-indirect model. It follows that the embodiments described above provides SC for DRF in the presence of scoped synchronization.

However, an interesting property of the embodiments is that it also provides the benefits of HRF-indirect even if one does not assume scoped synchronization. Viewing it from a different perspective, even if one imposes an HRF-direct model and all synchronizations must be non-scoped, or globally-scoped, to provide DRF guarantees across all cores, the benefits of scoped synchronization are obtained dynamically. Globally-scoped synchronization does not necessarily mean global sharing. This is due to the fact that the common shared level of race-free data is dynamically set at least as high as the highest level of any synchronization variable used to synchronize conflicting accesses between any two cores (even transitively). If the synchronization is confined within a cluster, the sharing is generally (but not always) confined within the same cluster. Because of such dynamic behavior and since the embodiments deliver the benefits of scoped synchronization dynamically (even in absence of scoped synchronization as such), other models are possible, such as for example an HRF-dynamic model that bridges the performance gap between HRF-direct and HRF-indirect with dynamic optimizations.

Embodiments thus provide for an efficient approach to coherence for hierarchical clustered cache architectures. Embodiments achieve this using, for example, mechanisms such as self-invalidation and write-through/self-downgrade, coupled with a hierarchical private/shared classification of data. The hierarchical private/shared classification encompasses the complexity of the hierarchy and allows simple implementations of more common coherence operations. The end result is a coherence protocol that uses a fraction of the states of a hierarchical directory protocol, at a comparable or better performance and reduced network traffic (12% overall, with significant reductions in 19 out of 22 benchmarks) and scales better than a hierarchical token protocol with 55% less traffic in 64 cores.

Figure 6:
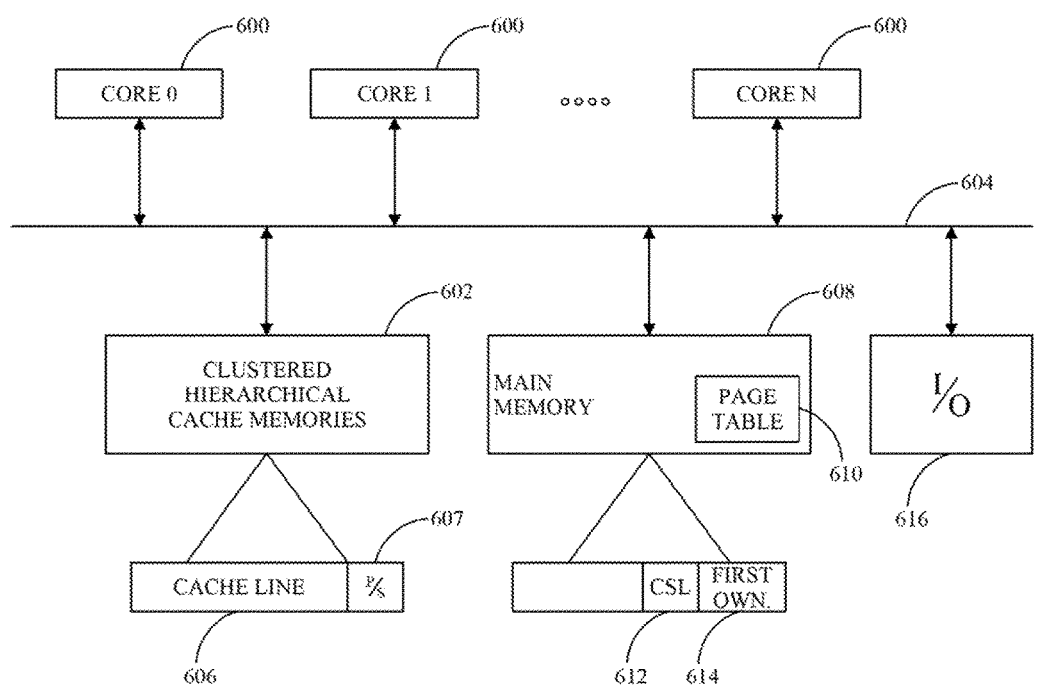
FIG. 6 illustrates a computing system including various bits which can be stored to implement coherence according to an embodiment.

As will be appreciated by those skilled in the art, the embodiments can be expressed in various ways including those described above. Multiprocessor or multicore computing systems having a clustered hierarchical cache memory system can employ the foregoing techniques, an example of which is shown in FIG. 6. Therein, multiple cores 600 are connected to a clustered hierarchical cache system 602 via an interconnect 604. The clustered hierarchical cache system 602 includes two or more levels of cache memories as described above, each of which is capable of storing a number of cache lines 606. The cache lines 606 can include a private/shared (P/S) bit 607 which indicates whether the data stored in that cache line is private or shared, which value can be determined as described above. A main memory 608 can also be included in the computer system. The main memory 608 can include a page table 610 which, as will be appreciated by those skilled in the art, can be used to translate between virtual addresses and physical addresses. According to an embodiment, otherwise unused bits in the page table 610 can be used to store the common shared level (CSL) value 612 and the first owner 614 of the associated page or memory block to be used as described above when determining whether to treat that page or block as private or shared, and thus how to address coherence events that occur relative to that page or block of data. Also shown are one or more input/output (I/O) units 616.

Figure 7:
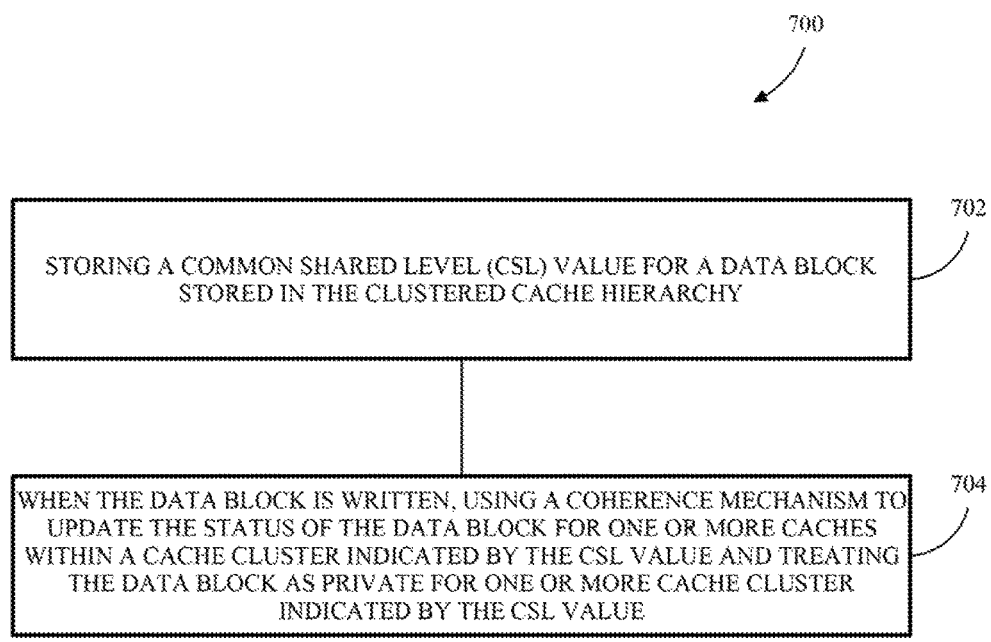
FIGS. 7 and 8 are flowcharts depicting methods according to embodiments.
Figure 8:
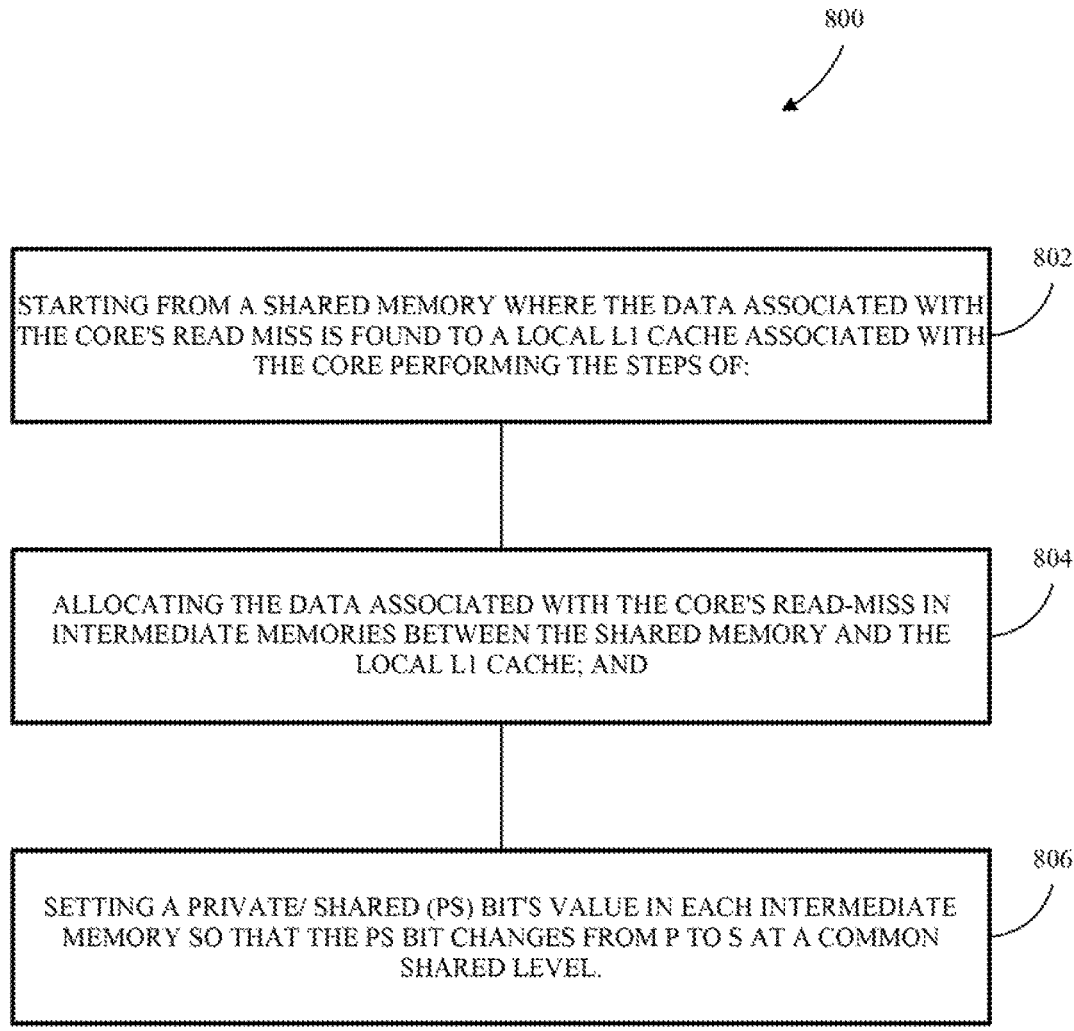

Similarly, embodiments can be expressed as methods, examples of which are provided in the flowcharts of FIGS. 7 and 8. FIG. 7, for example, depicts a method 700 for cache coherence in a computer system having a clustered cache hierarchy, the method comprising storing a common shared level (CSL) value for a data block stored in the clustered cache hierarchy at step 702; and, when the data block is written, using a coherence mechanism to update the status of the data block for one or more caches within a cache cluster indicated by the CSL value and treating the data block as private for one or more caches outside of the cache cluster indicated by the CSL value, as shown in step 704.

FIG. 8 depicts a method 800 for resolving a core's read miss according to an embodiment. The method includes, starting (802) from a shared memory where the data associated with the core's read miss is found to a local L1 cache associated with the core, performing the steps of: allocating (804) the data associated with the core's read-miss in intermediate memories between the shared memory and the local L1 cache; and setting (806) a private/shared (PS) bit's value in each intermediate memory so that the PS bit changes from P to S at a common shared level.

It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for cache coherence in a computer system having a clustered cache hierarchy, the method comprising:
    storing a common shared level (CSL) value for a data block stored in the clustered cache hierarchy;
    when the data block is written, using a coherence mechanism to update a status of the data block for one or more caches within a cache cluster indicated by the CSL value and treating the data block as private for one or more caches outside of the cache cluster indicated by the CSL value,
    detecting a translation look-aside buffer (TLB) miss associated with the data block; and
    determining a new CSL value for the data block in response to the detecting step.

2. The method of claim 1, wherein the clustered cache hierarchy includes at least three levels of cache memories wherein a first level, which is connected to multiple processor cores, includes at least three level one cache memories and wherein in each level with at least two cache memories, at least a pair of the at least two cache memories are connected to, and share, one of the cache memories at a higher level that is closer to main memory.

3. The method of claim 1, wherein the step of using a cache coherence mechanism further comprises:
    self-invalidating the data block in the one or more caches within the cache cluster indicated by the CSL value.

4. The method of claim 3, wherein the one or more caches within the cache cluster indicated by the CSL value which are self-invalidated include each level one cache and, when at least one intermediate cache is present in the cluster, each intermediate cache in the cluster.

5. The method of claim 1, wherein the CSL value and an identity of a core which first accessed the data block defines the cluster within the clustered cache hierarchy.

6. The method of claim 5, wherein the cluster includes one or more level two caches and one or more level 3 caches, wherein when the CSL value is three or higher, the one or more level 2 caches within the cluster are intermediate caches.

7. The method of claim 1, wherein the step of determining a new CSL value further comprises:
    retrieving a stored identity of a core which is a first owner of the data block;
    determining an identity of another core which attempted to access the data block causing the TLB miss; and
    determining to be said new CSL value, a lowest common cache level of the core which is the first owner of the data block and the another core.

* * * * *